US010416291B2

(12) United States Patent
Morita et al.

(10) Patent No.: US 10,416,291 B2
(45) Date of Patent: Sep. 17, 2019

(54) THREE-DIMENSIONAL MEASUREMENT DEVICE

(71) Applicant: TOPCON CORPORATION, Itabashi-ku, Tokyo (JP)

(72) Inventors: Hideki Morita, Itabashi-ku, Tokyo (JP); Ken'ichiro Yoshino, Itabashi-ku, Tokyo (JP); Yasushi Tanaka, Itabashi-ku, Tokyo (JP)

(73) Assignee: TOPCON CORPORATION, Itabashi-ku, Tokyo (JP)

( * ) Notice: Subject to any disclaimer, the term of this patent is extended or adjusted under 35 U.S.C. 154(b) by 0 days.

(21) Appl. No.: 15/935,138

(22) Filed: Mar. 26, 2018

(65) Prior Publication Data

US 2018/0284238 A1    Oct. 4, 2018

(30) Foreign Application Priority Data

Mar. 29, 2017    (JP) .................................. 2017-65168

(51) Int. Cl.
*G01S 7/00* (2006.01)
*G01S 7/481* (2006.01)
(Continued)

(52) U.S. Cl.
CPC .......... *G01S 7/4818* (2013.01); *G01B 11/002* (2013.01); *G01C 15/002* (2013.01);
(Continued)

(58) Field of Classification Search
USPC ............................................... 356/5.01, 4.01
See application file for complete search history.

(56) References Cited

U.S. PATENT DOCUMENTS 5,841,535 A * 11/1998 Aoki ....................... G01S 17/08
356/493
5,894,123 A * 4/1999 Ohtomo ............... G01C 15/004
250/236
(Continued)

FOREIGN PATENT DOCUMENTS

JP    H05134041 A    5/1993
JP    2006214844 A    8/2006
(Continued)

OTHER PUBLICATIONS

Extended Search Report dated Jun. 13, 2018, in connection with European Patent Application No. 18164167.1, 5 pgs.
(Continued)

*Primary Examiner* — James R Hulka
(74) *Attorney, Agent, or Firm* — Chiesa Shahinian & Giantomasi PC

(57) ABSTRACT

A three-dimensional measurement device includes a light source unit that emits distance measurement light, a projection light optical system that causes the distance measurement light, emitted by the light source unit, to be emitted along a distance measurement light axis, a light receiving optical unit that receives the reflected distance measurement light, a light receiving and splitting unit that splits the reflected distance measurement light that has transmitted through the light receiving optical unit into first reflected split light and second reflected split light, attenuates intensity of the second reflected split light to be lower than intensity of the first reflected split light, and converts the first reflected split light and the second reflected split light into electrical signals, and angle detection units that detect a light emitting direction of the distance measurement light.

5 Claims, 11 Drawing Sheets

(51) Int. Cl.
*G01C 15/00* (2006.01)
*G01B 11/00* (2006.01)
*G01S 17/42* (2006.01)
*G01S 17/89* (2006.01)

(52) U.S. Cl.
CPC .............. *G01S 17/42* (2013.01); *G01S 17/89* (2013.01); *G01S 7/4813* (2013.01)

(56) References Cited

U.S. PATENT DOCUMENTS

| | | | |
|---|---|---|---|
| 5,977,534 A | 11/1999 | Green et al. | |
| 6,098,031 A * | 8/2000 | Svetkoff | G01N 21/95684 250/559.23 |
| 6,177,998 B1 * | 1/2001 | Svetkoff | G01B 11/026 250/559.23 |
| 6,181,425 B1 * | 1/2001 | Svetkoff | G01B 11/026 250/559.23 |
| 7,502,100 B2 * | 3/2009 | Kawano | G01B 11/24 356/138 |
| 2003/0004412 A1 * | 1/2003 | Izatt | A61B 5/0066 600/425 |
| 2003/0067609 A1 * | 4/2003 | Morita | G01B 11/2441 356/512 |
| 2003/0184764 A1 * | 10/2003 | Svetkoff | G01B 11/2518 356/602 |
| 2004/0090633 A1 * | 5/2004 | Knuttel | G01B 11/2441 356/497 |
| 2005/0213102 A1 * | 9/2005 | Morita | G01B 11/2441 356/450 |
| 2006/0274329 A1 * | 12/2006 | Kawano | G01B 11/24 356/601 |
| 2007/0076189 A1 * | 4/2007 | Kumagai | G01C 3/08 356/5.01 |
| 2007/0159682 A1 * | 7/2007 | Tanaka | H04Q 11/0005 359/320 |
| 2008/0074637 A1 * | 3/2008 | Kumagai | G01C 15/002 356/4.01 |
| 2008/0316463 A1 * | 12/2008 | Okada | G01S 7/4812 356/4.01 |
| 2009/0122294 A1 * | 5/2009 | Okada | G01S 7/4812 356/4.01 |
| 2015/0309175 A1 * | 10/2015 | Hinderling | G01S 7/4813 356/4.01 |
| 2016/0320473 A1 | 11/2016 | Matsumoto et al. | |
| 2016/0356888 A1 | 12/2016 | Ohnishi et al. | |

FOREIGN PATENT DOCUMENTS

JP      2016-211873 A      12/2016
WO      2016008513 A1      1/2016

OTHER PUBLICATIONS

Notification of Reasons for Rejection dated Jul. 25, 2018, in connection with Japanese Patent Application No. 2017-065168, 6 pgs.

* cited by examiner

THREE-DIMENSIONAL MEASUREMENT DEVICE

CROSS-REFERENCE TO RELATED APPLICATIONS

This application claims priority to Japanese Patent Application No. 2017-65168, filed Mar. 29, 2017, which is herein incorporated by reference in its entirety.

FIELD

The present invention relates to a three-dimensional measurement device that irradiates a measurement target object with distance measurement light to measure a distance to the measurement target object, and detects a light emitting direction of the distance measurement light to acquire three-dimensional data on the measurement target object.

BACKGROUND

PTL1 discloses a three-dimensional measurement device that acquires three-dimensional data (three-dimensional point group data) on multiple points on a measurement target object. The three-dimensional measurement device described in PTL1 irradiates a measurement target object with a pulse laser beam, which is the distance measurement light, and receives reflected light of each pulse laser beam reflected on the measurement target object to measure the distance to the measurement target object. The three-dimensional measurement device further detects a light emitting direction (horizontal and vertical angles) of the distance measurement light to acquire three-dimensional data on the measurement target object. Three-dimensional laser scanners have been generally known as three-dimensional measurement devices disclosed in PTL1.

When the measurement target object is relatively highly reflective, an excessively large amount of reflected light might be reflected from a predetermined portion of the measurement target object, or reflected light with excessively high intensity might be reflected. For example, the three-dimensional measurement device may acquire three-dimensional data on a pipe with a curved surface in a factory. In such a case, the intensity of the reflected light, reflected from the surface of the pipe, might largely vary among portions of the pipe. For another example, the three-dimensional measurement device may acquire three-dimensional data on an area including a road sign having a surface including a reflective material or the like. In such a case, the intensity of the reflected light, reflected from the surface of the sign, might be excessively higher than the intensity of reflected light reflected from a portion other than the surface of the sign. These cases might result in the intensity of the reflected light overwhelming the maximum value of a dynamic range. When this happens, normal scanning by the three-dimensional measurement device might fail to acquire the three-dimensional data on some parts of the measurement target object.

When there is a portion of the measurement target object where the three-dimensional data has failed to be acquired, a measurer might perform the measurement again with a different measurement mode for example. However, this results in longer scanning time of the three-dimensional measurement device. Thus, expansion of the dynamic range and shortening of the scanning time of the three-dimensional measurement device have been called for.

Patent Document 1: Japanese Patent No. 2016-211873

SUMMARY OF THE EMBODIMENTS

The present invention is made to solve the problem described above, and an object of the present invention is to provide a three-dimensional measurement device that can achieve a wider dynamic range and shorter scanning time.

Means to Solve the Problem

The problem can be solved by a three-dimensional measurement device according to the present invention that irradiates a measurement target object with distance measurement light, measures a distance to the measurement target object based on reflected distance measurement light, which is the distance measurement light reflected by the measurement target object, and internal reference light, and acquires three-dimensional data on the measurement target object by detecting a light emitting direction of the distance measurement light. The three-dimensional measurement device includes a light source unit that emits the distance measurement light, a projection light optical system that causes the distance measurement light, emitted by the light source unit, to be emitted along a distance measurement light axis, a light receiving optical unit that receives the reflected distance measurement light, a light receiving and splitting unit that splits the reflected distance measurement light that has transmitted through the light receiving optical unit into first reflected split light and second reflected split light, attenuates intensity of the second reflected split light to be lower than intensity of the first reflected split light, and converts the first reflected split light and the second reflected split light into electrical signals, and an angle detection unit that detects the light emitting direction of the distance measurement light.

With this configuration, the light receiving and splitting unit splits the reflected distance measurement light that has transmitted through the light receiving optical unit into first reflected split light and second reflected split light, and attenuates the intensity of the second reflected split light to be lower than the intensity of the first reflected split light. The light receiving and splitting unit then converts the first reflected split light and the second reflected split light into electrical signals. Thus, the light receiving and splitting unit can receive both the first reflected split light with relatively high intensity and the second reflected split light with relatively low intensity. Thus, the maximum value of the dynamic range can be prevented from being overwhelmed by the intensity of the reflected distance measurement light, even when the measurement target object is relatively highly reflective, and the dynamic range can be expanded. For example, the light receiving and splitting unit can receive both the first reflected split light and the second reflected split light without the need for a measurer to perform the measurement again with a different measurement mode, whereby the scanning time can be shortened.

Preferably, the light receiving and splitting unit includes a beam splitter that splits the reflected distance measurement light into the first reflected split light and the second reflected split light, an optical fiber that transmits one of the first reflected split light and the second reflected split light in such a manner that the one of the first reflected split light and the second reflected split light is delayed relative to other one of the first reflected split light and the second reflected split light, an attenuator that is provided on an optical path of the second reflected split light and attenuates the intensity of the second reflected split light to be lower than the intensity of the first reflected split light, and a photodetector that receives the first reflected split light and the second reflected split light with the intensity attenuated, and converts the first reflected split light and the second reflected split light into the electrical signals.

With this configuration, the beam splitter splits the reflected distance measurement light into the first reflected split light and the second reflected split light. The optical fiber transmits one of the first reflected split light and the second reflected split light in such a manner that the one of the first reflected split light and the second reflected split light is delayed relative to other one of the first reflected split light and the second reflected split light. The attenuator provided on an optical path of the second reflected split light attenuates the intensity of the second reflected split light to be lower than the intensity of the first reflected split light. The photodetector receives the first reflected split light and the second reflected split light with the intensity attenuated, and converts them into the electrical signals. Thus, the photodetector can receive the first reflected split light with relatively high intensity and the second reflected split light with relatively low intensity, with a time interval. Thus, the light receiving and splitting unit can receive both the first reflected split light and the second reflected split light with a single photodetector, with the first reflected split light and the second reflected split light being identifiable due to the time interval. Thus, the dynamic range can be expanded, and the scanning time can be shortened Preferably, the light receiving and splitting unit includes a beam splitter that splits the reflected distance measurement light into the first reflected split light and the second reflected split light, an attenuator that is provided on an optical path of the second reflected split light and attenuates the intensity of the second reflected split light to be lower than the intensity of the first reflected split light, a first photodetector that receives the first reflected split light and converts the first reflected split light into the electrical signal, and a second photodetector that receives the second reflected split light with the intensity attenuated and converts the second reflected split light into the electrical signal.

With this configuration, the beam splitter splits the reflected distance measurement light into the first reflected split light and the second reflected split light. The attenuator provided on an optical path of the second reflected split light attenuates the intensity of the second reflected split light to be lower than the intensity of the first reflected split light. The first photodetector receives the first reflected split light and converts it into the electrical signal. The second photodetector receives the second reflected split light with the intensity attenuated and converts it into the electrical signal. According to this configuration, the first reflected split light with relatively high intensity is received by the first photodetector and the second reflected split light with relatively low intensity is received by the second photodetector different from the first photodetector. Thus, the light receiving and splitting unit can receive the first reflected split light and the second reflected split light with the two photodetectors, without making one of the first reflected split light and the second reflected split light delayed relative to the other one of the first reflected split light and the second reflected split light. Thus, the dynamic range can be expanded, and the scanning time can be shortened.

Preferably, the light receiving and splitting unit includes a first fiber coupler that splits the reflected distance measurement light into the first reflected split light and the second reflected split light based on a predetermined intensity ratio, a first optical fiber that transmits one of the first reflected split light and the second reflected split light in such a manner that the one of the first reflected split light and the second reflected split light is delayed relative to other one of the first reflected split light and the second reflected split light, a second optical fiber that transmits the other one of the first reflected split light and the second reflected split light, a second fiber coupler that combines the first reflected split light and the second reflected split light with the intensity attenuated with each other, and a photodetector that receives the reflected distance measurement light that has transmitted through the second fiber coupler, and converts the reflected distance measurement light into the electrical signal.

With this configuration, the first fiber coupler splits the reflected distance measurement light into the first reflected split light and the second reflected split light based on a predetermined intensity ratio. The first optical fiber transmits one of the first reflected split light and the second reflected split light in such a manner that the one of the first reflected split light and the second reflected split light is delayed relative to other one of the first reflected split light and the second reflected split light. The second optical fiber transmits the other one of the first reflected split light and the second reflected split light. The second fiber coupler combines the first reflected split light and the second reflected split light with the intensity attenuated with each other. The photodetector receives the first reflected split light and the second reflected split light that have transmitted through the second fiber coupler, and converts them into the electrical signals. Thus, the photodetector can receive the first reflected split light with relatively high intensity and the second reflected split light with relatively low intensity, with a time interval. Thus, the light receiving and splitting unit can receive both the first reflected split light and the second reflected split light with a single photodetector, with the first reflected split light and the second reflected split light being identifiable due to the time interval. Thus, the dynamic range can be expanded, and the scanning time can be shortened.

Preferably, the light receiving and splitting unit further includes an attenuator that is provided to one of the first optical fiber and the second optical fiber that transmits the second reflected split light, and attenuates the intensity of the second reflected split light to be lower than the intensity of the first reflected split light.

With this configuration, the light receiving and splitting unit further includes the attenuator that attenuates the intensity of the second reflected split light to be lower than the intensity of the first reflected split light. Thus, the dynamic range can further be expanded with the intensity ratio set to the first fiber coupler and an attenuation ratio set to the attenuator. With the attenuator provided, the photodetector can receive the first reflected split light with relatively high intensity and the second reflected split light with relatively low intensity, even when the intensity ratio set to the first fiber coupler is 50:50. Thus, the intensity ratio can be more freely set to the first fiber coupler, and the first fiber coupler can be more freely selected.

Preferably, the light receiving and splitting unit includes: a fiber coupler that splits the reflected distance measurement light into the first reflected split light and the second reflected split light based on a predetermined intensity ratio, a first optical fiber that transmits the first reflected split light, a second optical fiber that transmits the second reflected split light, a first photodetector that receives the first reflected split light that has transmitted through the first optical fiber and converts the first reflected split light into the electrical signal, and a second photodetector that receives the second reflected split light with the intensity attenuated that has transmitted through the second optical fiber and converts the second reflected split light into the electrical signal.

With this configuration, the fiber coupler splits the reflected distance measurement light into the first reflected split light and the second reflected split light based on a predetermined intensity ratio. The first optical fiber transmits the first reflected split light. The second optical fiber transmits the second reflected split light. The first photodetector receives the first reflected split light that has transmitted through the first optical fiber and converts it into the electrical signal. The second photodetector receives the second reflected split light with the intensity attenuated that has transmitted through the second optical fiber and converts it into the electrical signal. According to this configuration, the first reflected split light with relatively high intensity is received by the first photodetector and the second reflected split light with relatively low intensity is received by the second photodetector different from the first photodetector. Thus, the light receiving and splitting unit can receive the first reflected split light and the second reflected split light with the two photodetectors in an identifiable manner, without making one of the first reflected split light and the second reflected split light delayed relative to the other one of the first reflected split light and the second reflected split light. Thus, the dynamic range can be expanded, and the scanning time can be shortened.

Preferably, the light receiving and splitting unit further includes an attenuator that is provided to the second optical fiber, and attenuates the intensity of the second reflected split light to be lower than the intensity of the first reflected split light.

With this configuration, the light receiving and splitting unit further includes the attenuator that attenuates the intensity of the second reflected split light to be lower than the intensity of the first reflected split light. Thus, the dynamic range can further be expanded with the intensity ratio set to the fiber coupler and an attenuation ratio set to the attenuator. With the attenuator provided, the first reflected split light with relatively high intensity is received by the first photodetector and the second reflected split light with relatively low intensity is received by the second photodetector different from the first photodetector, even when the intensity ratio set to the fiber coupler is 50:50. Thus, the intensity ratio can be more freely set to the fiber coupler, and the fiber coupler can be more freely selected.

The present invention can provide a three-dimensional measurement device that can achieve a wider dynamic range and shorter scanning time.

DESCRIPTION OF THE EMBODIMENTS

Figure 1:
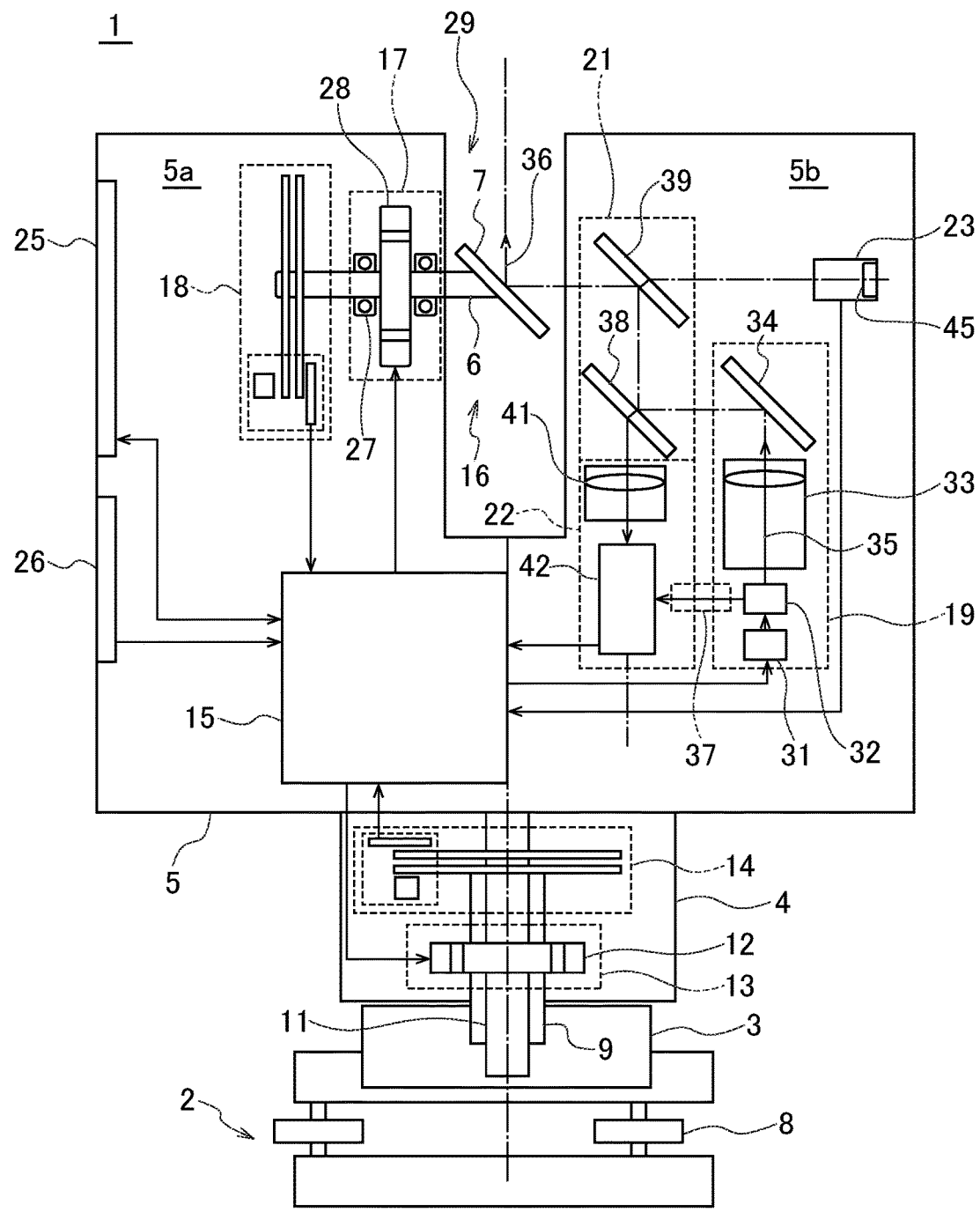
FIG. 1 is a block diagram illustrating a three-dimensional measurement device according to an embodiment of the present invention.

Preferred embodiments of the present invention are described below in detail with reference to the attached drawings.

The embodiments described below are preferred examples of the present invention and thus have various technically preferable limitations. However, the scope of the present invention is not limited to these unless stated otherwise in the following description. Same compositions in the figures are denoted with the same reference numeral and the detail description thereof will be omitted as appropriate.

FIG. 1 is a block diagram illustrating a three-dimensional measurement device according to an embodiment of the present invention.

The present embodiment is described with a three-dimensional laser scanner as an example of the three-dimensional measurement device.

As illustrated in FIG. 1, a three-dimensional measurement device 1 includes a leveling unit 2 attached to a tripod (not illustrated), a base unit 3 provided to the leveling unit 2, a frame unit 5 provided to the base unit 3, via a horizontal rotation unit 4, to be rotatable in a horizontal direction, and a scanning mirror 7 that is provided to the frame unit 5 in such a manner as to be rotatable in a vertical direction (high-low direction) about a vertical rotation shaft 6.

For example, the leveling unit 2 includes three leveling screws 8. The leveling with the leveling unit 2 is performed with the leveling screws 8 adjusted so that a horizontal state is detected by an inclination sensor (not illustrated) provided to the frame unit 5.

The horizontal rotation unit 4 includes a horizontal rotation shaft 11 that is rotatably supported by the base unit 3 via a bearing 9 while being supported to be in a vertical posture. The frame unit 5 is supported by the horizontal rotation shaft 11, and integrally rotates with the horizontal rotation shaft 11.

The horizontal rotation unit 4 accommodates a horizontal driving unit 13 including a horizontal driving motor 12 and a horizontal angle detector (for example, an encoder) 14 that detects a rotational angle of the horizontal rotation shaft 11. The frame unit 5 is rotated, about the horizontal rotation shaft 11, by driving force transmitted from the horizontal driving motor 12. The horizontal angle detector 14 detects the rotational angle of the horizontal rotation shaft 11 relative to the base unit 3 (that is, the rotational angle of the frame unit 5).

The horizontal angle detector 14 inputs the detection result (horizontal angle) to a control calculation unit 15. The control calculation unit 15 controls driving of the horizontal driving motor 12 based on the detection result obtained by the horizontal angle detector 14.

The frame unit 5 has a center portion provided with a recess 16. A first chamber 5a and a second chamber 5b are formed on both sides of the recess 16. The first chamber 5a (the left side chamber in FIG. 1) accommodates a vertical driving unit 17 and a vertical angle detector 18. The second chamber 5b (the right side chamber in FIG. 1) accommodates a distance measurement light emitting unit 19, a common optical path section 21, a distance measurement unit 22, and an imaging unit 23. The control calculation unit 15 is accommodated by the frame unit 5 to be at a predetermined inner position. The frame unit 5 has predetermined portions provided with a display unit 25 and an operation unit 26

The vertical rotation shaft 6 has a horizontally extending axis, and is rotatably supported by the frame unit 5 via a bearing 27. The vertical rotation shaft 6 has one end portion protruding into the recess 16. The one end portion of the vertical rotation shaft 6, protruding into the recess 16, is provided with the scanning mirror 7 inclined by 45° relative to the axis of the vertical rotation shaft 6. The scanning mirror 7 is supported, in the recess 16, by the vertical rotation shaft 6, and can rotate in the vertical direction about the vertical rotation shaft 6.

The vertical driving unit 17 includes a vertical driving motor 28 that rotates the vertical rotation shaft 6. The scanning mirror 7 is rotated by driving force transmitted from the vertical driving motor 28 via the vertical rotation shaft 6. A scanning unit 29 according to the present embodiment includes the vertical rotation shaft 6, the scanning mirror 7, and the vertical driving motor 28.

The vertical rotation shaft 6 has the other end portion provided with the vertical angle detector 18 (an incremental encoder for example). The vertical angle detector 18 detects the rotational angle of the vertical rotation shaft 6 relative to the frame unit 5. The vertical angle detector 18 inputs the detection result (vertical angle) to the control calculation unit 15. The control calculation unit 15 controls driving of the vertical driving motor 28 based on the detection result of the vertical angle detector 18.

The distance measurement light emitting unit 19 includes a distance measurement light source unit 31, an optical path splitting member 32 such as a half mirror and a beam splitter, a projection light optical system 33 including an objective lens and the like, and a mirror 34. The distance measurement light source unit 31, an example of which includes a semiconductor laser and the like, emits distance measurement light 35 along a distance measurement light axis 36. The distance measurement light 35 according to the present embodiment is an infrared pulse laser beam that is invisible light. The distance measurement light source unit 31 is controlled by the control calculation unit 15 to emit pulse light under predetermined conditions including predetermined intensity and a predetermined pulse interval.

The common optical path section 21 includes a first beam splitter 38 and a second beam splitter 39. The distance measurement unit 22 includes a light receiving optical unit 41 including a condenser lens and the like and a light receiving and splitting unit 42. The light receiving and splitting unit 42 splits reflected distance measurement light, which is the distance measurement light 35 reflected by a measurement target object (not illustrated) and transmitted through the light receiving optical unit 41, into first reflected split light and second reflected split light. The light receiving and splitting unit 42 attenuates the intensity of the second reflected split light to be lower than that of the first reflected split light. The light receiving and splitting unit 42 converts the first reflected split light and the second reflected split light into electrical signals. The light receiving and splitting unit 42 will be described in detail later.

A part of the distance measurement light 35 output from the distance measurement light source unit 31 transmits through the optical path splitting member 32 to be incident on the mirror 34 via the projection light optical system 33. The distance measurement light 35, incident on the mirror 34, is reflected by the mirror 34 to be guided to the common optical path section 21. The remaining part of the distance measurement light 35, output from the distance measurement light source unit 31, is reflected by the optical path splitting member 32 to be guided to an internal reference light path 37 as the internal reference light.

The distance measurement light 35 reflected by the mirror 34 is sequentially reflected by the first beam splitter 38 and the second beam splitter 39, to be guided to the scanning mirror 7. The distance measurement light 35 that has transmitted through the first beam splitter 38 and the second beam splitter 39 is absorbed by an antireflection member (not illustrated).

The scanning mirror 7 is a deflecting optical member, and reflects the distance measurement light 35, received in the horizontal direction, at a right angle. The reflected distance measurement light incident on the scanning mirror 7 is reflected to be in the horizontal direction toward the second beam splitter 39.

The distance measurement light 35 guided to the scanning mirror 7 from the common optical path section 21 is reflected by the scanning mirror 7 to be emitted onto the measurement target object. When the scanning mirror 7 rotates about the vertical rotation shaft 6, the distance measurement light 35 is rotary emitted in a vertical plane. When the frame unit 5 is rotated in the horizontal direction by the horizontal rotation unit 4, the distance measurement light 35 is rotary emitted in the horizontal direction about the horizontal rotation shaft 11. Thus, the three-dimensional measurement device 1 can scan the entire measurement range with the distance measurement light 35, with a combination of the rotation of the scanning mirror 7 in the vertical direction and the rotation of the frame unit 5 in the horizontal direction.

The reflected distance measurement light, reflected by the measurement target object in the measurement range, is made incident on the scanning mirror 7. The reflected distance measurement light incident on the scanning mirror 7 is reflected by the scanning mirror 7 to enter the common optical path section 21. The reflected distance measurement light is reflected by the second beam splitter 39 and transmits through the first beam splitter 38 to be guided to the distance measurement unit 22.

The distance measurement unit 22 receives the reflected distance measurement light that has transmitted through the first beam splitter 38, and receives internal reference light guided by the internal reference light path 37. The reflected distance measurement light and the internal reference light are respectively converted into a reflected distance measurement light electrical signal and an internal reference light electrical signal, in the light receiving and splitting unit 42 of the distance measurement unit 22, to be transmitted to the control calculation unit 15. The distance to the measurement target object is measured based on a difference between the reflected distance measurement light electrical signal and the internal reference light electrical signal in time interval.

The control calculation unit 15 calculates a coordinate value of the measurement target object, based on the distance to the measurement target object thus measured, a vertical angle detected by the vertical angle detector 18, and a horizontal angle detected by the horizontal angle detector 14. The control calculation unit 15 records the coordinate value of the measurement target object obtained with each pulse light, whereby point group data on the entire measurement range or point group data on the measurement target object can be obtained. The angle detection unit that detects the direction of the distance measurement light axis 36 includes the horizontal angle detector 14 and the vertical angle detector 18. Thus, the light emitting direction of the distance measurement light 35 is detected by the angle detection unit including the horizontal angle detector 14 and the vertical angle detector 18.

An image sensor 45 is provided on an imaging optical axis of the imaging unit 23. The image sensor 45 includes a group of pixels, and outputs a digital image signal. Examples of the image sensor 45 include a charge-coupled device (CCD), a complementary metal oxide semiconductor (CMOS) sensor, and the like. The position of each pixel of the image sensor 45 in the image senor 45 can be designated.

Figure 2:
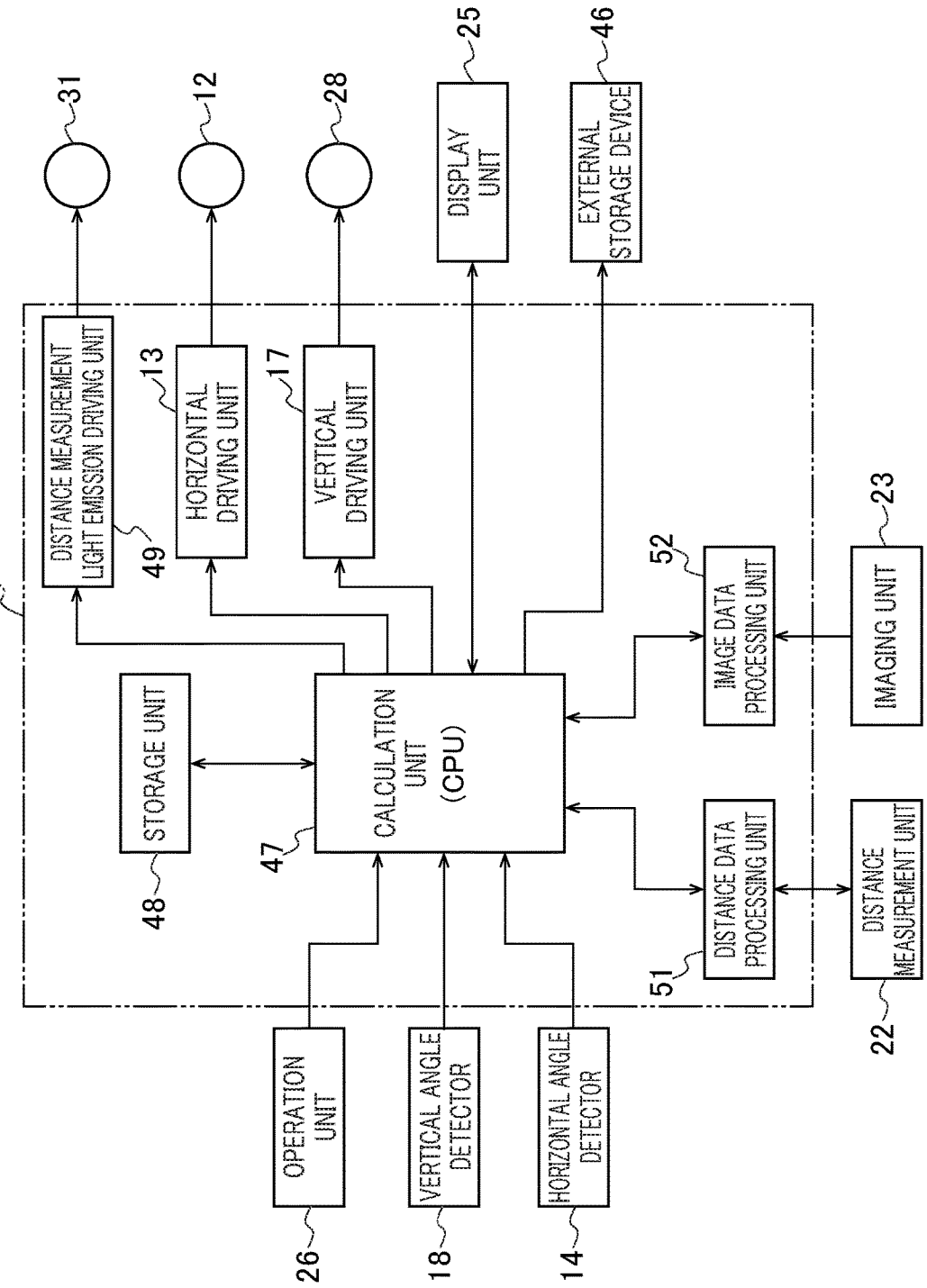
FIG. 2 is a block diagram illustrating a control system of the three-dimensional measurement device according to the present embodiment.

FIG. 2 is a block diagram illustrating a control system of the three-dimensional measurement device according to the present embodiment.

The control calculation unit 15 is electrically connected with the operation unit 26, the vertical angle detector 18, and the horizontal angle detector 14. The control calculation unit 15 receives angle detection signals, output from the vertical angle detector 18 and the horizontal angle detector 14, and receives an operation signal output from the operation unit 26 based on an operation of an operator.

The operator uses the operation unit 26 to set conditions required for the three-dimensional measurement device 1 to start the measurement. Examples of the required conditions include setting on the measurement range, setting on point group data density (pitch), setting on an imaging condition used for imaging, and the like. The setting conditions and the like input using the operation unit 26 are displayed on the display unit 25. Thus, the operator can check the setting conditions and the like, input using the operation unit 26, on the display unit 25. The operation unit 26 and the display unit 25 may be provided to the frame unit 5, or may be provided independently from the frame unit 5, and may be remotely operable with a signal transmission medium such as radio waves or infrared light.

The control calculation unit 15 drives the distance measurement light source unit 31, the horizontal driving motor 12 and the vertical driving motor 28, and controls the display unit 25 for displaying a work status and a measurement result. The control calculation unit 15 is provided with an external storage device 46 such as a memory card and a hard disk drive (HDD). The external storage device 46 may be fixed to or detachably attached to the control calculation unit 15.

The control calculation unit 15 includes as a calculation unit 47 (typically, a CPU), a storage unit 48, a distance measurement light emission driving unit 49 that controls light emission by the distance measurement light source unit 31, the horizontal driving unit 13 that controls the driving of the horizontal driving motor 12, and the vertical driving unit 17 that controls driving of the vertical driving motor 28. The control calculation unit 15 further includes a distance data processing unit 51 that processes distance data obtained by the distance measurement unit 22 and an image data processing unit 52 that processes image data obtained by the imaging unit 23.

The storage unit 48 stores therein a program including: a sequence program for executing distance measurement, vertical angle measurement, and horizontal angle measurement; a calculation program for executing distance measurement calculation or the like; a measurement data processing program for executing processing on measurement data; an imaging program for controlling an imaging status of the imaging unit 23; an image processing program for executing image processing; and an image display program for causing the display unit 25 to display data, or stores therein a program that entirely manages these programs or the like. The storage unit 48 stores therein data including measurement data, image data, and the like.

The calculation unit 47 may have functions of the distance data processing unit 51 and the image data processing unit 52. In this configuration, the distance data processing unit 51 and the image data processing unit 52 are not necessarily needed.

The distance data processing unit 51 and the image data processing unit 52 may be provided separately from the control calculation unit 15. For example, a personal computer different from the control calculation unit 15 may execute the functions of the distance data processing unit 51 and the image data processing unit 52. In this configuration, for example, the distance data and the image data are transmitted from the three-dimensional measurement device 1 to the personal computer, via communication means of the three-dimensional measurement device 1 and the personal computer. Then, the personal computer executes the distance data processing and the image data processing. Examples of the communication means include an optical communications, wireless communication, and local area network (LAN).

When a measurement target object is relatively highly reflective, the amount of reflected light reflected from a predetermined portion of the measurement target object might be too large or the intensity of the reflected light might be too high for the three-dimensional measurement device with the configuration described above. Thus, the maximum value of the dynamic range might be overwhelmed by the intensity of the reflected light. As a result, normal scanning by the three-dimensional measurement device might fail to acquire the three-dimensional data in some portions of the measurement target object.

In view of this, the three-dimensional measurement device 1 according to the present embodiment has the light receiving and splitting unit 42 splitting the reflected distance measurement light that has transmitted through the light receiving optical unit 41 into the first reflected split light and the second reflected split light, with the intensity of the second reflected split light attenuated to be lower than that of the first reflected split light. The light receiving and splitting unit 42 converts the first reflected split light and the second reflected split light into the electrical signals. Thus, the light receiving and splitting unit 42 can receive both the first reflected split light with relatively high intensity and the second reflected split light with relatively low intensity. Thus, the maximum value of the dynamic range can be prevented from being overwhelmed by the intensity of the reflected distance measurement light, even when the measurement target object is relatively highly reflective, and the dynamic range can be expanded. For example, the light receiving and splitting unit 42 can receive both the first reflected split light and the second reflected split light without the need for a measurer to perform the measurement again with a different measurement mode, whereby the scanning time can be shortened.

Next, specific examples of the light receiving and splitting unit according to the present embodiment are described with reference to the drawings.

Figure 3:
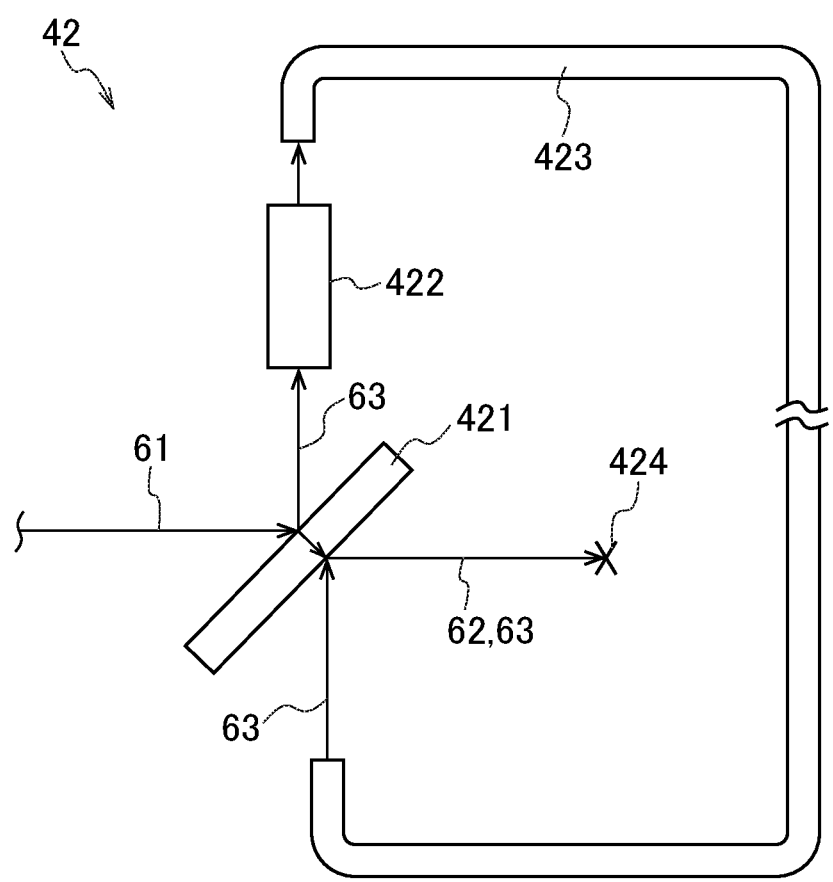
FIG. 3 is a plan view of an optical system representing a first specific example of the light receiving and splitting unit.

FIG. 3 is a plan view of an optical system representing a first specific example of the light receiving and splitting unit.

Figure 4:
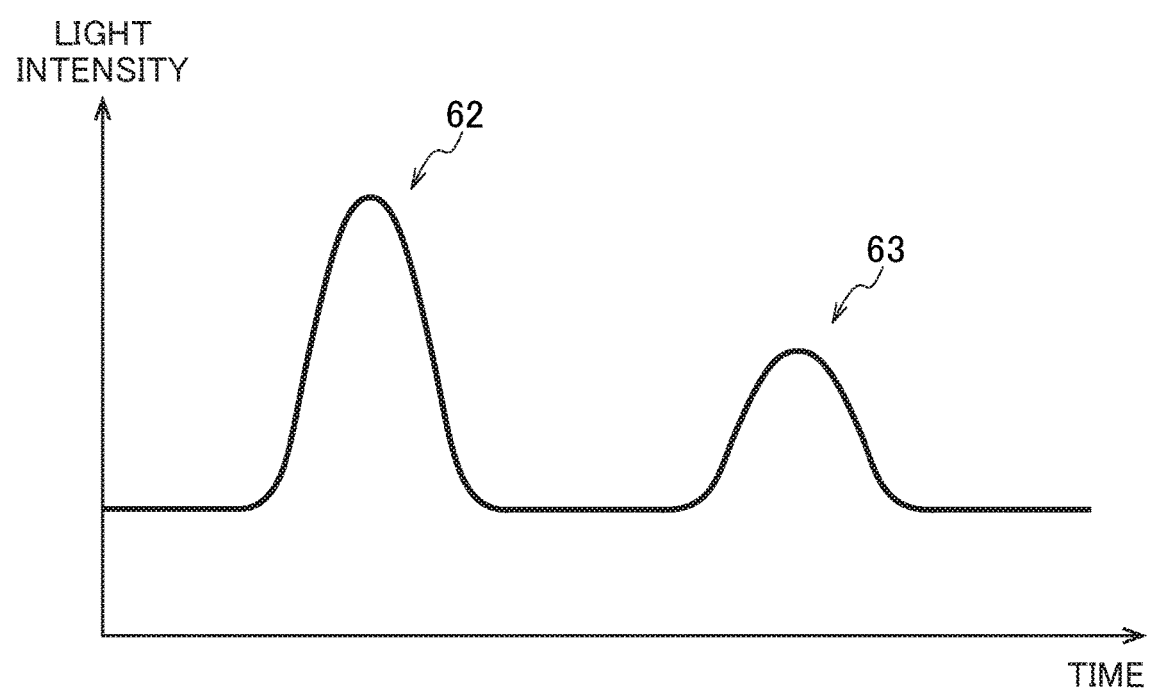
FIG. 4 is a graph illustrating relationship between the intensity of the reflected distance measurement light received by a photodetector according to the specific example and time.

FIG. 4 is a graph illustrating relationship between the intensity of the reflected distance measurement light received by a photodetector according to this specific example and time.

The graph illustrated in FIG. 4 has a horizontal axis representing time and a vertical axis representing the intensity of the reflected distance measurement light received by the photodetector according to this specific example.

As illustrated in FIG. 3, the light receiving and splitting unit 42 according to this specific example includes a beam splitter 421, an attenuator 422, an optical fiber 423, and a photodetector 424. The beam splitter 421 splits reflected distance measurement light 61 that has transmitted through the light receiving optical unit 41 into first reflected split light 62 and second reflected split light 63. In this specific example, the reflected distance measurement light that has transmitted through the beam splitter 421 is guided to and received, as the first reflected split light 62, by the photodetector 424. The reflected distance measurement light reflected by the beam splitter 421 is guided, as the second reflected split light 63, to the attenuator 422. Intensity ratio, involved in the splitting of the reflected distance measurement light 61 into the first reflected split light 62 and the second reflected split light 63 by the beam splitter 421 is not particularly limited, and may be 50:50 for example. Specifically, the "beam splitter" of the light receiving and splitting unit, as used herein, includes a half mirror.

The attenuator 422 is provided in an optical path of the second reflected split light 63 and attenuates the intensity of the second reflected split light 63 to be lower than that of the first reflected split light 62. Specifically, the second reflected split light 63 that has passed through the attenuator 422 has intensity attenuated to be lower than that of the first reflected split light 62. The second reflected split light 63 with the intensity thus attenuated enters the optical fiber 423.

The second reflected split light 63 passes through the optical fiber 423 to be delayed relative to the first reflected split light 62. Specifically, the second reflected split light 63 that has entered the optical fiber 423 passes through the optical fiber 423 and is emitted from the optical fiber 423 to be reflected by the beam splitter 421. The second reflected split light 63 reflected by the beam splitter 421 is guided to and received by the photodetector 424. The length of the optical path of the second reflected split light 63 is longer than that of the optical path of the first reflected split light 62. Thus, the second reflected split light 63 with the intensity attenuated to be lower than that of the first reflected split light 62 is received by the photodetector 424 later than the first reflected split light 62 is as illustrated in FIG. 4. The photodetector 424 converts the first reflected split light 62 and the second reflected split light 63 with the attenuated intensity thus received into electrical signals.

In this specific example, the photodetector 424 can receive the first reflected split light 62 with relatively high intensity and the second reflected split light 63 with relatively low intensity, with a time interval. Thus, the light receiving and splitting unit 42 can receive both the first reflected split light 62 and the second reflected split light 63 with a single photodetector 424, with the first reflected split light 62 and the second reflected split light 63 being identifiable due to the time interval. Thus, the dynamic range can be expanded, and the scanning time can be shortened.

Alternatively, the first reflected split light 62 may transmit through the optical fiber 423 to be delayed relative to the second reflected split light 63. Specifically, the first reflected split light 62 may transmit through the inside of the optical fiber 423 to be received by the photodetector 424 later than the second reflected split light 63 with the attenuated intensity is. Also with this configuration, the dynamic range can be expanded, and the scanning time can be shortened.

Figure 5:
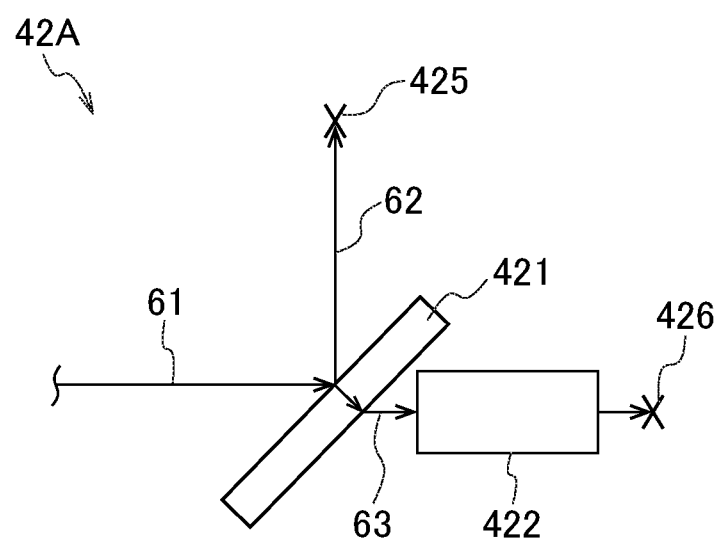
FIG. 5 is a plan view illustrating an optical system representing a second specific example of the light receiving and splitting unit.

FIG. 5 is a plan view illustrating an optical system representing a second specific example of the light receiving and splitting unit.

Figure 6A:
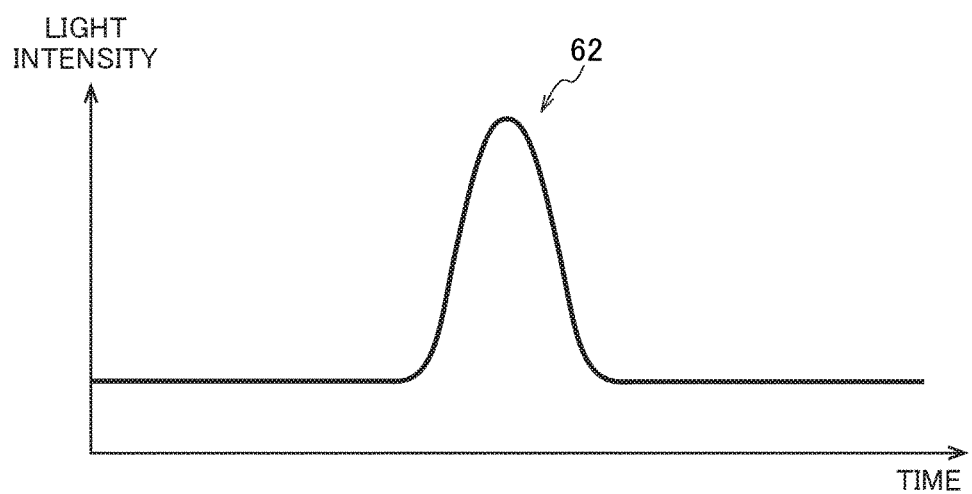
FIGS. 6A and 6B are graphs illustrating relationship between the intensity of the reflected distance measurement light received by the photodetector according to the specific example and time.
Figure 6B:
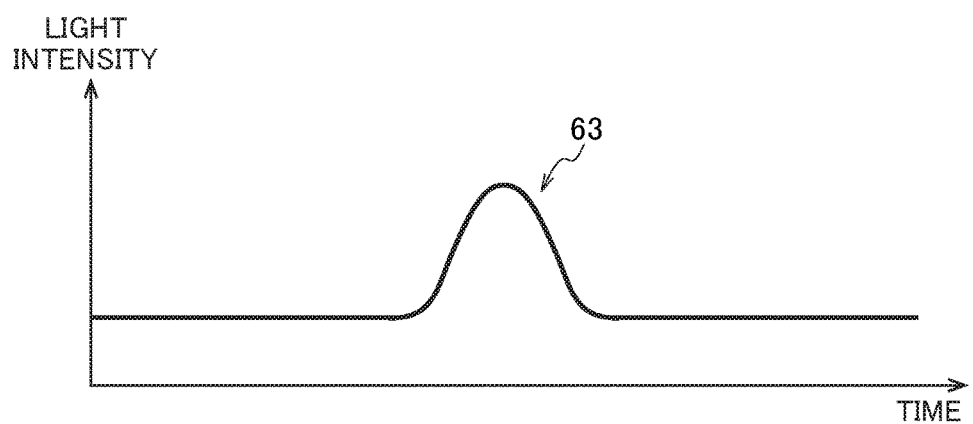

FIGS. 6A and 6B are graphs illustrating relationship between the intensity of the reflected distance measurement light received by the photodetector according to this specific example and time.

FIG. 6A is a graph illustrating relationship between intensity of first reflected split light received by a first photodetector and time. FIG. 6B is a graph illustrating relationship between intensity of second reflected split light received by a second photodetector and time. The graphs illustrated in FIG. 6A and FIG. 6B each have a horizontal axis representing time and a vertical axis representing the intensity of the reflected distance measurement light received by the photodetector according to this specific example.

As illustrated in FIG. 5, a light receiving and splitting unit 42A according to this specific example includes the beam splitter 421, the attenuator 422, a first photodetector 425, and a second photodetector 426. The beam splitter 421 splits the reflected distance measurement light 61 that has transmitted through the light receiving optical unit 41 into the first reflected split light 62 and the second reflected split light 63. In this specific example, as illustrated in FIG. 5 and FIG. 6A, the reflected distance measurement light that has reflected by the beam splitter 421 is guided to and received, as the first reflected split light 62, by the first photodetector 425. The first photodetector 425 converts the first reflected split light 62 into an electrical signal. The reflected distance measurement light that has transmitted through the beam splitter 421 is guided, as the second reflected split light 63, to the attenuator 422.

The attenuator 422 is provided in an optical path of the second reflected split light 63 and attenuates the intensity of the second reflected split light 63 to be lower than that of the first reflected split light 62. Specifically, the second reflected split light 63 that has passed through the attenuator 422 has intensity attenuated to be lower than that of the first reflected split light 62. The second reflected split light 63 with the intensity thus attenuated as illustrated in FIG. 6B is guided to and received by the second photodetector 426. The second photodetector 426 converts the second reflected split light 63 into an electrical signal.

In this specific example, the first reflected split light 62 with relatively high intensity is received by the first photodetector 425 and the second reflected split light 63 with relatively low intensity is received by the second photodetector 426 different from the first photodetector 425. Thus, the light receiving and splitting unit 42A according to this specific example can receive the first reflected split light 62 and the second reflected split light 63 with the two photodetectors (the first photodetector 425 and the second photodetector 426) in an identifiable manner, without making one of the first reflected split light 62 and the second reflected split light 63 delayed relative to the other one of the first reflected split light 62 and the second reflected split light 63. Thus, the dynamic range can be expanded, and the scanning time can be shortened.

A timing at which the first photodetector 425 receives the first reflected split light 62 and a timing at which the second photodetector 426 receives the second reflected split light 63 are not particularly limited, and may not necessarily be the same. One of the first reflected split light 62 and the second reflected split light 63 may be received later than the other one of the first reflected split light 62 and the second reflected split light 63 is.

Figure 7:
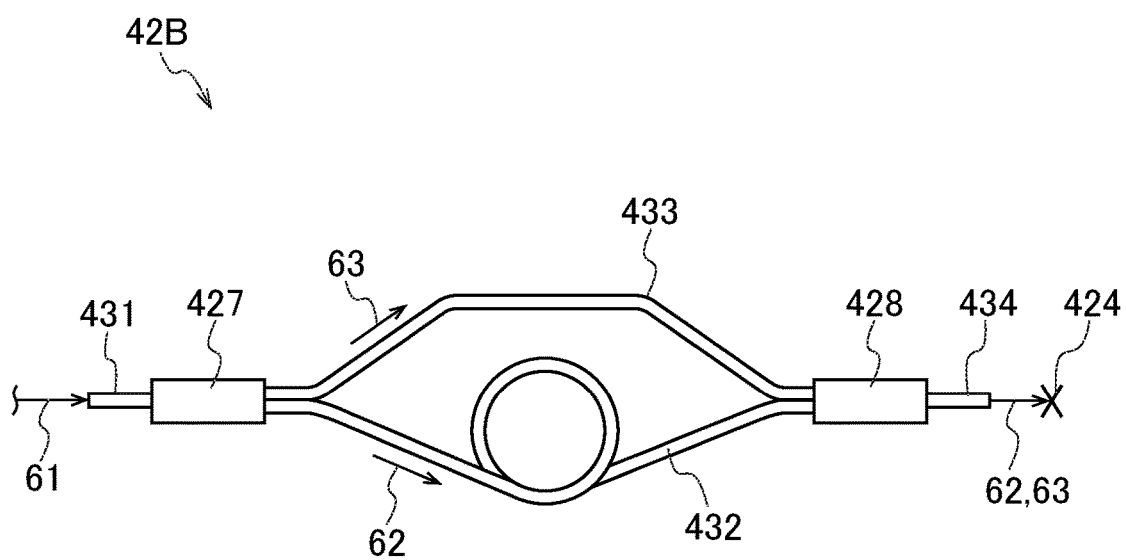
FIG. 7 is a plan view illustrating a third specific example of the light receiving and splitting unit.

FIG. 7 is a plan view illustrating a third specific example of the light receiving and splitting unit.

Figure 8:
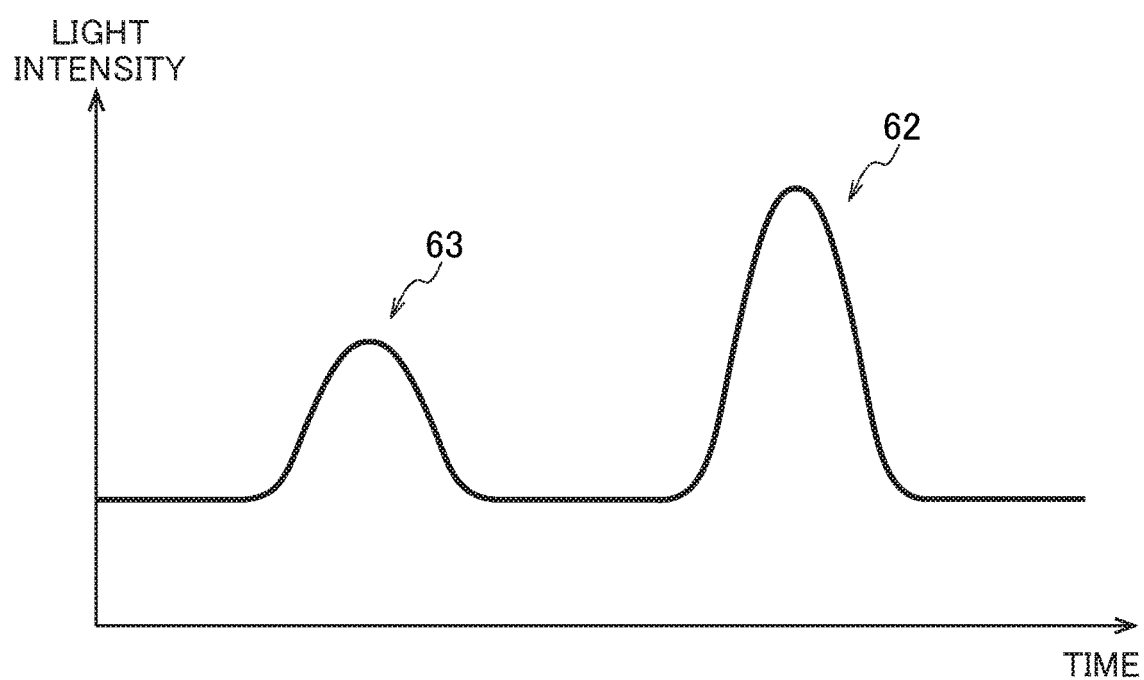
FIG. 8 is a graph illustrating relationship between the intensity of the reflected distance measurement light received by the photodetector according to this specific example and time.

FIG. 8 is a graph illustrating relationship between the intensity of the reflected distance measurement light received by the photodetector according to this specific example and time.

The graph illustrated in FIG. 8 has a horizontal axis representing time and a vertical axis representing the intensity of the reflected distance measurement light received by the photodetector according to this specific example.

As illustrated in FIG. 7, a light receiving and splitting unit 42B according to this specific example includes an entrance side optical fiber 431, a first fiber coupler 427, a first optical fiber 432, a second optical fiber 433, a second fiber coupler 428, an exit side optical fiber 434, and the photodetector 424. The reflected distance measurement light 61 that has transmitted through the light receiving optical unit 41 passes through the inside of the entrance side optical fiber 431 to be guided to the first fiber coupler 427.

The first fiber coupler 427 splits the reflected distance measurement light 61 into the first reflected split light 62 and the second reflected split light 63, based on a predetermined intensity ratio. In this specific example, the first fiber coupler 427 splits the reflected distance measurement light 61 into the first reflected split light 62 with relatively high intensity and the second reflected split light 63 with relatively low intensity. The first reflected split light 62 passes through the inside of the first optical fiber 432 to be guided to the second fiber coupler 428. The second reflected split light 63 passes through the inside of the second optical fiber 433 to be guided to the second fiber coupler 428.

The first reflected split light 62 passes through the first optical fiber 432 to be delayed relative to the second reflected split light 63. Specifically, the first optical fiber 432 is longer than the second optical fiber 433. Thus, the length of the optical path of the first reflected split light 62 is longer than that of the optical path of the second reflected split light 63. Thus, the first reflected split light 62 is transmitted to the second fiber coupler 428 later than the second reflected split light 63 is. The first reflected split light 62 and the second reflected split light 63 transmitted to the second fiber coupler 428 are combined to each other by the second fiber coupler 428, and then the resultant light is guided to the photodetector 424. Thus, as illustrated in FIG. 8, the second reflected split light 63 with the intensity attenuated to be lower than that of the first reflected split light 62 is received by the photodetector 424 earlier than the first reflected split light 62 is. The photodetector 424 converts the first reflected split light 62 and the second reflected split light 63 with the attenuated intensity thus received into electrical signals.

In this specific example, the photodetector 424 can receive the first reflected split light 62 with relatively high intensity and the second reflected split light 63 with relatively low intensity with a time interval. Thus, the light receiving and splitting unit 42B can receive both the first reflected split light 62 and the second reflected split light 63 with a single photodetector 424, with the first reflected split light 62 and the second reflected split light 63 being identifiable due to the time interval. Thus, the dynamic range can be expanded, and the scanning time can be shortened.

The second optical fiber 433 may be longer than the first optical fiber 432. Alternatively, the second reflected split light 63 may be transmitted through the first optical fiber 432 to be delayed relative to the first reflected split light 62. Specifically, the second reflected split light 63 may be transmitted to the second fiber coupler 428 later than the first reflected split light 62 is. In this configuration, a graph indicating relationship between the intensity of the first reflected split light 62 and the second reflected split light 63 received by the photodetector 424 and time is the same as that described above with reference to FIG. 4.

Figure 9:
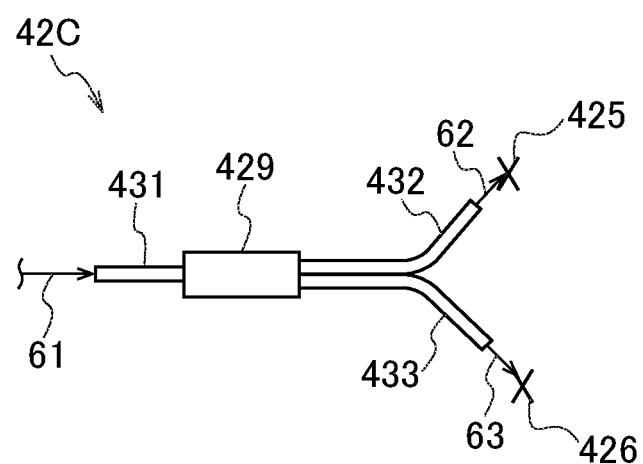
FIG. 9 is a plan view illustrating a fourth specific example of the light receiving and splitting unit.

FIG. 9 is a plan view illustrating a fourth specific example of the light receiving and splitting unit.

A light receiving and splitting unit 42C according to this specific example includes the entrance side optical fiber 431, a fiber coupler 429, the first optical fiber 432, the second optical fiber 433, the first photodetector 425, and the second photodetector 426. The reflected distance measurement light 61 that has transmitted through the light receiving optical unit 41 passes through the inside of the entrance side optical fiber 431 to be guided to the fiber coupler 429.

The fiber coupler 429 splits the reflected distance measurement light 61 into the first reflected split light 62 and the second reflected split light 63, based on a predetermined intensity ratio. In present specific example, the fiber coupler 429 splits the reflected distance measurement light 61 into the first reflected split light 62 with relatively high intensity and the second reflected split light 63 with relatively low intensity. The first reflected split light 62 passes through the inside of the first optical fiber 432 to be guided to and received by the first photodetector 425. A graph indicating relationship between the intensity of the first reflected split light 62 received by the first photodetector 425 and time is the same as that described above with reference to FIG. 6A. The first photodetector 425 converts the first reflected split light 62 into an electrical signal.

The second reflected split light 63 passes through the inside of the second optical fiber 433 to be guided to and received by the second photodetector 426. A graph indicating relationship between the intensity of the second reflected split light 63 received by the second photodetector 426 and time is the same as that described above with reference to FIG. 6B. The second photodetector 426 converts the second reflected split light 63 into an electrical signal.

In this specific example, the first reflected split light 62 with relatively high intensity is received by the first photodetector 425 and the second reflected split light 63 with relatively low intensity is received by the second photodetector 426 different from the first photodetector 425. Thus, the light receiving and splitting unit 42C according to this specific example can receive the first reflected split light 62 and the second reflected split light 63 with the two photodetectors (the first photodetector 425 and the second photodetector 426) in an identifiable manner, without making one of the first reflected split light 62 and the second reflected split light 63 delayed relative to the other one of the first reflected split light 62 and the second reflected split light 63. Thus, the dynamic range can be expanded, and the scanning time can be shortened.

A timing at which the first photodetector 425 receives the first reflected split light 62 and a timing at which the second photodetector 426 receives the second reflected split light 63 are not particularly limited, and may not necessarily be the same. One of the first reflected split light 62 and the second reflected split light 63 may be received later than the other one of the first reflected split light 62 and the second reflected split light 63 is.

Figure 10:
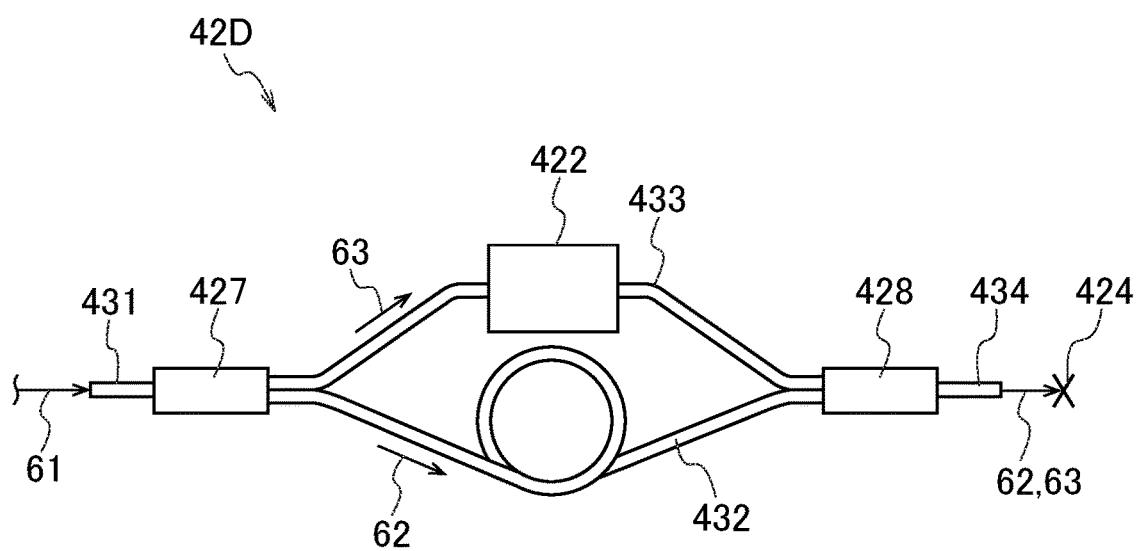
FIG. 10 is a plan view illustrating a fifth specific example of the light receiving and splitting unit.

FIG. 10 is a plan view illustrating a fifth specific example of the light receiving and splitting unit.

A light receiving and splitting unit 42D according to this specific example is different from the light receiving and splitting unit 42B according to the third specific example described above with reference to FIG. 7 and FIG. 8 in that the attenuator 422 is further provided. In this point, the light receiving and splitting unit 42D according to this specific example is different from the light receiving and splitting unit 42B according to the third specific example described with reference to FIG. 7 and FIG. 8.

The attenuator 422 according to this specific example is provided to the second optical fiber 433 and attenuates the intensity of the second reflected split light 63 to be lower than that of the first reflected split light 62. Specifically, the second reflected split light 63 that has passed through the second optical fiber 433 passes through the attenuator 422 to have intensity attenuated to be lower than that of the first reflected split light 62. The other configuration is the same as that of the light receiving and splitting unit 42B according to the third specific example described above with reference to FIG. 7 and FIG. 8. A graph indicating relationship between the intensity of the first reflected split light 62 and the second reflected split light 63 received by the photodetector 424 and time is the same as that described above with reference to FIG. 8.

In this specific example, the dynamic range can further be expanded with the intensity ratio set to the first fiber coupler 427 and an attenuation ratio set to the attenuator 422. With the attenuator 422 provided, the photodetector 424 can receive the first reflected split light 62 with relatively high intensity and the second reflected split light 63 with relatively low intensity, even when the intensity ratio set to the first fiber coupler 427 is 50:50. Thus, the intensity ratio can be more freely set to the first fiber coupler 427, and the first fiber coupler 427 can be more freely selected.

As described above with reference to FIG. 7 and FIG. 8, the length of the second optical fiber 433 may be longer than that of the first optical fiber 432. Alternatively, the second reflected split light 63 may transmit through the first optical fiber 432 to be delayed relative to the first reflected split light 62. Thus, the second reflected split light 63 may be transmitted to the second fiber coupler 428 later than the first reflected split light 62 is. When the second reflected split light 63 is to be transmitted in the first optical fiber 432, the attenuator 422 is provided to the first optical fiber 432.

Figure 11:
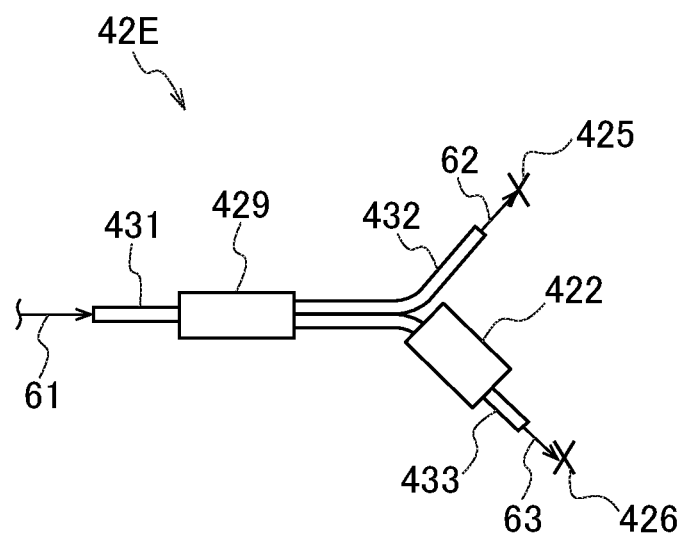
FIG. 11 is a plan view illustrating a sixth specific example of the light receiving and splitting unit.

FIG. 11 is a plan view illustrating a sixth specific example of the light receiving and splitting unit.

A light receiving and splitting unit 42E according this specific example is different from the light receiving and splitting unit 42C according to the fourth specific example described above with reference to FIG. 9 in that the attenuator 422 is further provided. In this point, the light receiving and splitting unit 42E according to this specific example is different from the light receiving and splitting unit 42C according to the fourth specific example described with reference to FIG. 9.

The attenuator 422 according to this specific example is provided to the second optical fiber 433 and attenuates the intensity of the second reflected split light 63 to be lower than that of the first reflected split light 62. Specifically, the second reflected split light 63 that has passed through the second optical fiber 433 passes through the attenuator 422 to have intensity attenuated to be lower than that of the first reflected split light 62. The other configuration is the same as that of the light receiving and splitting unit 42C according to the fourth specific example described above with reference to FIG. 9. A graph indicating relationship between the intensity of the first reflected split light 62 received by the first photodetector 425 and time is the same as that described above with reference to FIG. 6A. A graph indicating relationship between the intensity of the second reflected split light 63 received by the second photodetector 426 and time is the same as that described above with reference to FIG. 6B.

In this specific example, the dynamic range can further be expanded with the intensity ratio set to the fiber coupler 429 and an attenuation ratio set to the attenuator 422. With the attenuator 422 provided, the first photodetector 425 receives the first reflected split light 62 with relatively high intensity and the second photodetector 426 different from the first photodetector 425 receives the second reflected split light 63 with relatively low intensity, even when the intensity ratio set to the fiber coupler 429 is 50:50. Thus, the intensity ratio can be more freely set to the fiber coupler 429, and the fiber coupler 429 can be more freely selected.

The embodiment of the present invention is described above. Note that the present invention is not limited to the embodiment described above, and can be modified in various ways without departing from the scope of claims. The configuration of the embodiment described above may have parts omitted or combined in any ways to be different from the above described configuration.

EXPLANATION OF REFERENCE NUMERALS

1 . . . three-dimensional measurement device, 2 . . . leveling unit, 3 . . . base unit, 4 . . . horizontal rotation unit, 5 . . . frame unit, 5a . . . first chamber, 5b . . . second chamber, 6 . . . vertical rotation shaft, 7 . . . scanning mirror, 8 . . . leveling screw, 9 . . . bearing, 11 . . . horizontal rotation shaft, 12 . . . horizontal driving motor, 13 . . . horizontal driving unit, 14 . . . horizontal angle detector, 15 . . . control calculation unit, 16 . . . recess, 17 . . . vertical driving unit, 18 . . . vertical angle detector, 19 . . . distance measurement light emitting unit, 21 . . . common optical path section, 22 . . . distance measurement unit, 23 . . . imaging unit, 25 . . . display unit, 26 . . . operation unit, 27 . . . bearing, 28 . . . vertical driving motor, 29 . . . scanning unit, 31 . . . distance measurement light source unit, 32 . . . optical path splitting member, 33 . . . projection light optical system, 34 . . . mirror, 35 . . . distance measurement light, 36 . . . distance measurement light axis, 37 . . . internal reference light path, 38 . . . first beam splitter, 39 . . . second beam splitter, 41 . . . light receiving optical unit, 42, 42A, 42B, 42C, 42D, 42E . . . light receiving and splitting unit, 45 . . . image sensor, 46 . . . external storage device, 47 . . . calculation unit, 48 . . . storage unit, 49 . . . distance measurement light emission driving unit, 51 . . . distance data processing unit, 52 . . . image data processing unit, 61 . . . reflected distance measurement light, 62 . . . first reflected split light, 63 . . . second reflected split light, 421 . . . beam splitter, 422 . . . attenuator, 423 . . . optical fiber, 424 . . . photodetector, 425 . . . first photodetector, 426 . . . second photodetector, 427 . . . first fiber coupler, 428 . . . second fiber coupler, 429 . . . fiber coupler, 431 . . . entrance side optical fiber, 432 . . . first optical fiber, 433 . . . second optical fiber, 434 . . . exit side optical fiber

What is claimed is:

1. A three-dimensional measurement device that irradiates a measurement target object with distance measurement light, measures a distance to the measurement target object based on reflected distance measurement light, which is the distance measurement light reflected by the measurement target object, and internal reference light, and acquires three-dimensional data on the measurement target object by detecting a light emitting direction of the distance measurement light, the three-dimensional measurement device comprising:
  a light source unit that emits the distance measurement light;
  a projection light optical system that causes the distance measurement light, emitted by the light source unit, to be emitted along a distance measurement light axis;
  a light receiving optical unit that receives the reflected distance measurement light;
  a light receiving and splitting unit that splits the reflected distance measurement light that has transmitted through the light receiving optical unit into first reflected split light and second reflected split light, attenuates intensity of the second reflected split light to be lower than intensity of the first reflected split light, and converts the first reflected split light and the second reflected split light into electrical signals;
  an angle detection unit that includes a horizontal angle detector and a vertical angle detector, and that detects the light emitting direction of the distance measurement light, the horizontal angle detector detecting a rotational angle of a horizontal rotation shaft, the vertical angle detector detecting a rotational angle of a vertical rotation shaft; and
  a control calculation unit that calculates a coordinate value of the measurement target object, based on the distance to the measurement target object measured by a distance measurement unit having the light receiving and splitting unit, a vertical angle detected by the vertical angle detector, and a horizontal angle detected by the horizontal angle detector,
  wherein the light receiving and splitting unit includes:
  a beam splitter that splits the reflected distance measurement light into the first reflected split light and the second reflected split light;
  an optical fiber that transmits the second reflected split light in such a manner that the second reflected split light is delayed relative to the first reflected split light;
  an attenuator that is provided on an optical path of the second reflected split light and attenuates the intensity of the second reflected split light to be lower than the intensity of the first reflected split light; and
  a photodetector that receives the first reflected split light and the second reflected split light with a time interval, and converts the first reflected split light and the second reflected split light into the electrical signals, the first reflected split light having transmitted through the beam splitter, the second reflected split light being reflected by the beam splitter, the second reflected split light having transmitted through the optical fiber, being delayed relative to the first reflected split light, and having the intensity attenuated to be lower than the intensity of the first reflected split light.

2. A three-dimensional measurement device that irradiates a measurement target object with distance measurement light, measures a distance to the measurement target object based on reflected distance measurement light, which is the distance measurement light reflected by the measurement target object, and internal reference light, and acquires three-dimensional data on the measurement target object by detecting a light emitting direction of the distance measurement light, the three-dimensional measurement device comprising:
  a light source unit that emits the distance measurement light;
  a projection light optical system that causes the distance measurement light, emitted by the light source unit, to be emitted along a distance measurement light axis;
  a light receiving optical unit that receives the reflected distance measurement light;
  a light receiving and splitting unit that splits the reflected distance measurement light that has transmitted through the light receiving optical unit into first reflected split light and second reflected split light, attenuates intensity of the second reflected split light to be lower than intensity of the first reflected split light, and converts the first reflected split light and the second reflected split light into electrical signals;
  an angle detection unit that includes a horizontal angle detector and a vertical angle detector, and that detects the light emitting direction of the distance measurement light, the horizontal angle detector detecting a rotational angle of a horizontal rotation shaft, the vertical angle detector detecting a rotational angle of a vertical rotation shaft; and
  a control calculation unit that calculates a coordinate value of the measurement target object, based on the distance to the measurement target object measured by a distance measurement unit having the light receiving and splitting unit, a vertical angle detected by the vertical angle detector, and a horizontal angle detected by the horizontal angle detector,
  wherein the light receiving and splitting unit includes:
  a first fiber coupler that splits the reflected distance measurement light into the first reflected split light and the second reflected split light based on a predetermined intensity ratio;
  a first optical fiber that transmits the first reflected split light in such a manner that the first reflected split light is delayed relative to the second reflected split light;
  a second optical fiber that transmits the second reflected split light;
  a second fiber coupler that combines the first reflected split light and the second reflected split light, the first reflected split light having transmitted through the first optical fiber, the second reflected split light having transmitted through the second optical fiber, the second reflected split light being delayed relative to the first reflected split light, and having the intensity attenuated to be lower than the intensity of the first reflected split light; and
  a photodetector that receives the first reflected split light and the second reflected split light that has transmitted through the second fiber coupler with a time interval, and converts the reflected distance measurement light into the electrical signals.

3. The three-dimensional measurement device according to claim 2, wherein the light receiving and splitting unit further includes an attenuator that is provided to the second optical fiber and attenuates the intensity of the second reflected split light to be lower than the intensity of the first reflected split light.

4. A three-dimensional measurement device that irradiates a measurement target object with distance measurement light, measures a distance to the measurement target object based on reflected distance measurement light, which is the distance measurement light reflected by the measurement target object, and internal reference light, and acquires three-dimensional data on the measurement target object by detecting a light emitting direction of the distance measurement light, the three-dimensional measurement device comprising:
- a light source unit that emits the distance measurement light;
- a projection light optical system that causes the distance measurement light, emitted by the light source unit, to be emitted along a distance measurement light axis;
- a light receiving optical unit that receives the reflected distance measurement light;
- a light receiving and splitting unit that splits the reflected distance measurement light that has transmitted through the light receiving optical unit into first reflected split light and second reflected split light, attenuates intensity of the second reflected split light to be lower than intensity of the first reflected split light, and converts the first reflected split light and the second reflected split light into electrical signals;
- an angle detection unit that includes a horizontal angle detector and a vertical angle detector, and that detects the light emitting direction of the distance measurement light, the horizontal angle detector detecting a rotational angle of a horizontal rotation shaft, the vertical angle detector detecting a rotational angle of a vertical rotation shaft; and
- a control calculation unit that calculates a coordinate value of the measurement target object, based on the distance to the measurement target object measured by a distance measurement unit having the light receiving and splitting unit, a vertical angle detected by the vertical angle detector, and a horizontal angle detected by the horizontal angle detector, wherein the light receiving and splitting unit includes:
- a fiber coupler that splits the reflected distance measurement light into the first reflected split light and the second reflected split light based on a predetermined intensity ratio;
- a first optical fiber that transmits the first reflected split light;
- a second optical fiber that transmits the second reflected split light;
- a first photodetector that receives the first reflected split light that has transmitted through the first optical fiber and converts the first reflected split light into the electrical signal; and
- a second photodetector that receives the second reflected split light with the intensity attenuated to be lower than the intensity of the first reflected split light that has transmitted through the second optical fiber and converts the second reflected split light into the electrical signal, and
  - wherein the light receiving and splitting unit identifies the first reflected split light received by the first photodetector and the second reflected split light received by the second photodetector.

5. The three-dimensional measurement device according to claim 4, wherein the light receiving and splitting unit further includes an attenuator that is provided to the second optical fiber, and attenuates the intensity of the second reflected split light to be lower than the intensity of the first reflected split light.

* * * * *